Patented Aug. 13, 1935

2,011,443

UNITED STATES PATENT OFFICE 2,011,443

COMPOSITION OF MATTER

Irvine W. Grote, Detroit, Mich., assignor to Parke, Davis & Company, Detroit, Mich., a corporation of Michigan No Drawing. Application April 10, 1931, Serial No. 529,292

8 Claims. (Cl. 167—74)

The invention relates to therapeutic agents obtained from the pituitary gland.

I have discovered a new pituitary substance having physiological properties different from all other pituitary products heretofore described. My new product contains what may be termed a derived hormone since it is obtained by chemical treatment of a pituitary gland material containing another hormone of the gland.

The derived pituitary hormone is preferably obtained from a pituitary substance containing the pressor principle substantially free from the oxytocic principle. The ordinary commercial posterior pituitary extracts, however, may also be used for this purpose. The preferred process involves the treatment of such material with alkali for a period of time sufficient to substantially destroy the pressor activity while preserving the activity of the new hormone. The resulting product has anti-diuretic properties but substantially no pressor properties. Thus the new substance is a valuable therapeutic agent useful in treatment of conditions requiring an anti-diuretic effect where a corresponding rise in blood pressure is undesirable or at least unnecessary.

The preferred process is as follows: 1.0 gram of a pituitary substance high in pressor activity and low in oxytocic activity is dissolved in 10 c. c. water. To this is added 10 c. c. of 10% sodium hydroxide and the solution allowed to stand at room temperature of 25° C. during one-half hour. It is then exactly neutralized with hydrochloric acid resulting in the evolution of hydrogen sulphide gas. The solution is warmed to remove this gas and then evaporated to dryness. The residue is extracted with 98% acetic acid, filtered and precipitated with three volumes ether plus six volumes purified benzene. The precipitate is filtered from the solution, washed with ether and dried. It is a white amorphous powder, very soluble in water and insoluble in ether and acetone.

The new substance when administered to dogs in the usual manner for pituitary products has substantially no effect on the blood pressure. It has, however, a marked anti-diuretic effect on mice and is preferably standardized on mice in the same manner as other pituitary products heretofore known.

In the above process the nature of the alkali used, the temperature, and the time of exposure, may be adjusted. At slightly higher temperatures, a fifteen to thirty minute exposure is sufficient, but at the temperatures approaching the boiling point of water, the new product is readily destroyed. Several hours exposure, even at room temperature, causes serious loss of activity. When it is desired to prepare a product extremely low in pressor activity, a one-hour exposure at about 25° C. is preferred, although the yield is somewhat reduced. Other alkalies, as, for instance, calcium hydroxide and potassium hydroxide and even strong organic bases, may be substituted for sodium hydroxide since the action is not in any way specific for sodium hydroxide. The reaction may also be varied by incorporating a reactive compound capable of reacting with sulphur as, for instance, lead hydroxide.

What I claim as my invention is:

1. The process of obtaining an anti-diuretic substance comprising the treating of a posterior pituitary substance high in pressor activity with an alkali and neutralizing the alkali as soon as the pressor activity has been substantially destroyed but before excessive loss of anti-diuretic activity has occurred.

2. The process of obtaining a therapeutic agent having anti-diuretic properties and substantially free from pressor properties comprising the forming of a water solution of a substance derived from the posterior lobe of the pituitary gland and containing both pressor and anti-diuretic properties, adding an alkali hydroxide, maintaining the solution at substantially room temperature for approximately thirty minutes, neutralizing with acid, warming the solution to remove hydrogen sulphide gas, evaporating to dryness, extracting with acetic acid, treating the extract with ether and benzene causing a precipitation, and washing and drying the precipitate to obtain the therapeutic agent as a white amorphous powder.

3. A therapeutic agent comprising an extract of the posterior lobe of the pituitary gland from which naturally occurring sulphur has been removed, said extract being water soluble, having anti-diuretic properties and substantially no effect on blood pressure.

4. A therapeutic agent comprising a white amorphous powder derivable from the posterior lobe of the pituitary gland by removal of naturally occurring sulphur, said extract being water soluble, having anti-diuretic properties and substantially no effect on blood pressure.

5. The process of obtaining a therapeutic agent having anti-diuretic properties and substantially free from pressor properties comprising reacting a substance derived from the posterior lobe of the pituitary gland and containing both pressor and anti-diuretic properties with a hydroxide compound capable of reacting with sulphur in and also destroying the pressor properties of said gland substance and separating the resulting sulphur compound and excess of said hydroxide compound from said agent before excessive destruction of the anti-diuretic properties of said therapeutic agent.

6. The process of obtaining a therapeutic agent having anti-diuretic properties and substantially free from pressor properties comprising reacting a substance derived from the posterior lobe of the pituitary gland and containing both pressor and anti-diuretic properties with an alkaline hydroxide compound capable of reacting with sulphur in and also destroying the pressor properties of said gland substance and separating the resulting sulphur compound and excess of said alkaline hydroxide compound from said agent before excessive destruction of the anti-diuretic properties of said therapeutic agent.

7. The process of obtaining a therapeutic agent having anti-diuretic properties and substantially free from pressor properties comprising reacting a substance derived from the posterior lobe of the pituitary gland and containing both pressor and anti-diuretic properties with sodium hydroxide at a temperature substantially below 100° C. for a period of time not exceeding several hours, said temperature and time being regulated to destroy a substantial amount of pressor activity while maintaining a substantial amount of anti-diuretic activity and removing excess sodium hydroxide and the hydrogen sulphide resulting from the reaction.

8. A therapeutic agent derived from the posterior lobe of the pituitary gland, having anti-diuretic properties, substantially no effect on blood pressure and substantially no oxytocic activity and in the amorphous solid form being water soluble and insoluble in acetone and ether.

IRVINE W. GROTE.